United States Patent
Braunschweig et al.

(10) Patent No.: US 6,327,732 B1
(45) Date of Patent: Dec. 11, 2001

(54) FLUID BALANCING RING AND METHOD FOR USING SAME

(75) Inventors: James R. Braunschweig, Ankeny; James F. Crawford, Newton; Jeffrey L. Sears, Grinnell; Daniel F. Wunderlich, Newton, all of IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 09/567,930

(22) Filed: May 10, 2000

(51) Int. Cl.[7] .................................................... D06F 37/24
(52) U.S. Cl. ................... 8/159; 68/23.2; 68/23.3; 74/573 F; 210/144
(58) Field of Search .................. 68/12.06, 23.1, 68/23.2, 23.3, 23.4; 210/144; 74/573 F; 8/158, 159

(56) References Cited

U.S. PATENT DOCUMENTS

| | | | |
|---|---|---|---|
| 2,224,241 | * | 12/1940 | Verdier et al. . |
| 2,463,801 | * | 3/1949 | Page . |
| 2,538,246 | * | 1/1951 | Holm-Hansen . |
| 2,549,756 | * | 4/1951 | Clark . |
| 2,798,610 | * | 7/1957 | Meyer . |
| 2,886,979 | * | 5/1959 | Baxter . |
| 3,812,724 | * | 5/1974 | Curtz et al. . |
| 3,950,897 | * | 4/1976 | Birkenstack et al. . |
| 4,583,912 | * | 4/1986 | Ball et al. . |
| 4,873,887 | * | 10/1989 | Andra et al. . |
| 5,156,067 | * | 10/1992 | Umeyama . |
| 5,582,040 | | 12/1996 | Khan ..................................... 68/23.2 |
| 5,709,109 | | 1/1998 | Cho ....................................... 68/23.2 |
| 5,761,933 | * | 6/1998 | Kim et al. . |
| 5,782,110 | | 7/1998 | Kim ...................................... 68/23.3 |
| 5,806,349 | * | 9/1998 | Im et al. . |
| 5,813,253 | | 9/1998 | Uhlin .................................... 68/23.2 |

FOREIGN PATENT DOCUMENTS

| | | | |
|---|---|---|---|
| 54-26071 | * | 2/1979 | (JP) ..................................... 68/23.2 |
| 60-18440 | * | 5/1985 | (JP) ..................................... 68/23.2 |
| 60-99294 | * | 6/1985 | (JP) ..................................... 68/23.2 |
| 4-40998 | * | 2/1992 | (JP) . |

* cited by examiner

Primary Examiner—Frankie L. Stinson
(74) Attorney, Agent, or Firm—Zarley, McKee, Thomte, Voorhees & Sease

(57) ABSTRACT

A fluid balancing ring includes a plurality of partitions forming a circular array of sub-chambers around its circumference. A valve is associated with each of the partitions and is movable in response to the centrifugal force of the rotating balance ring from a closed position preventing fluid communication through the partitions to an open position permitting fluid communication through the partitions. A spring urges the valve to its closed position.

18 Claims, 5 Drawing Sheets

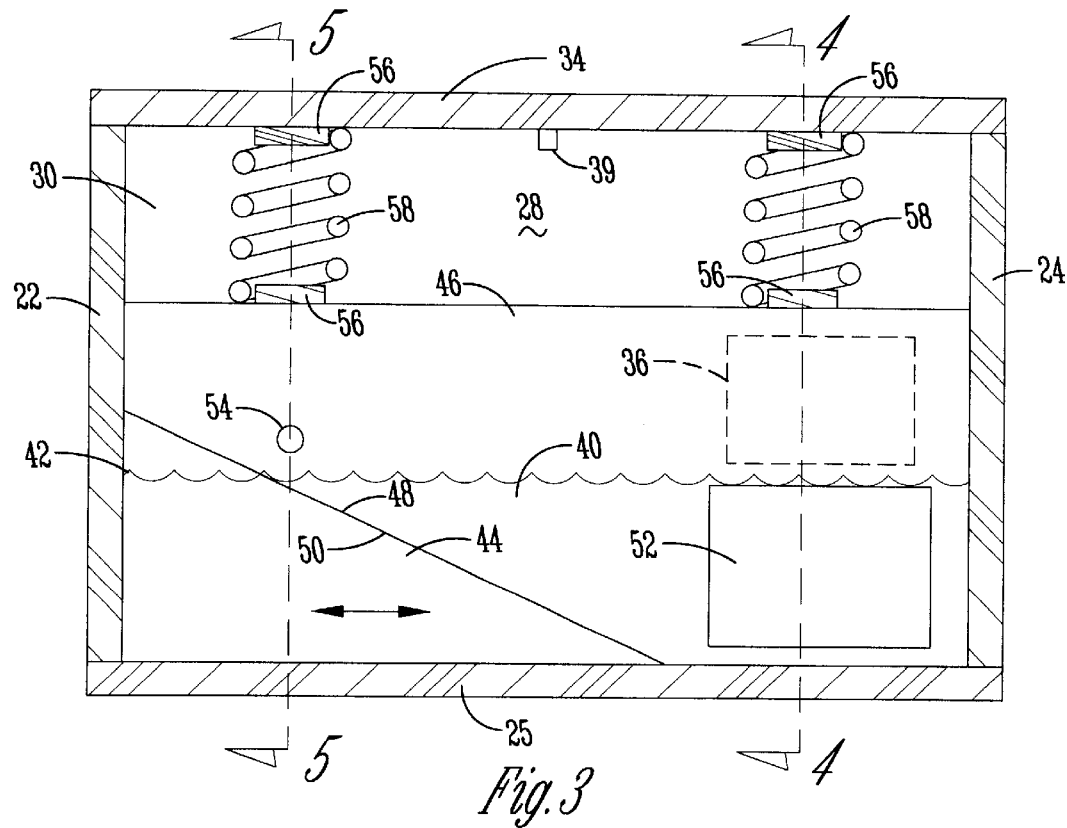
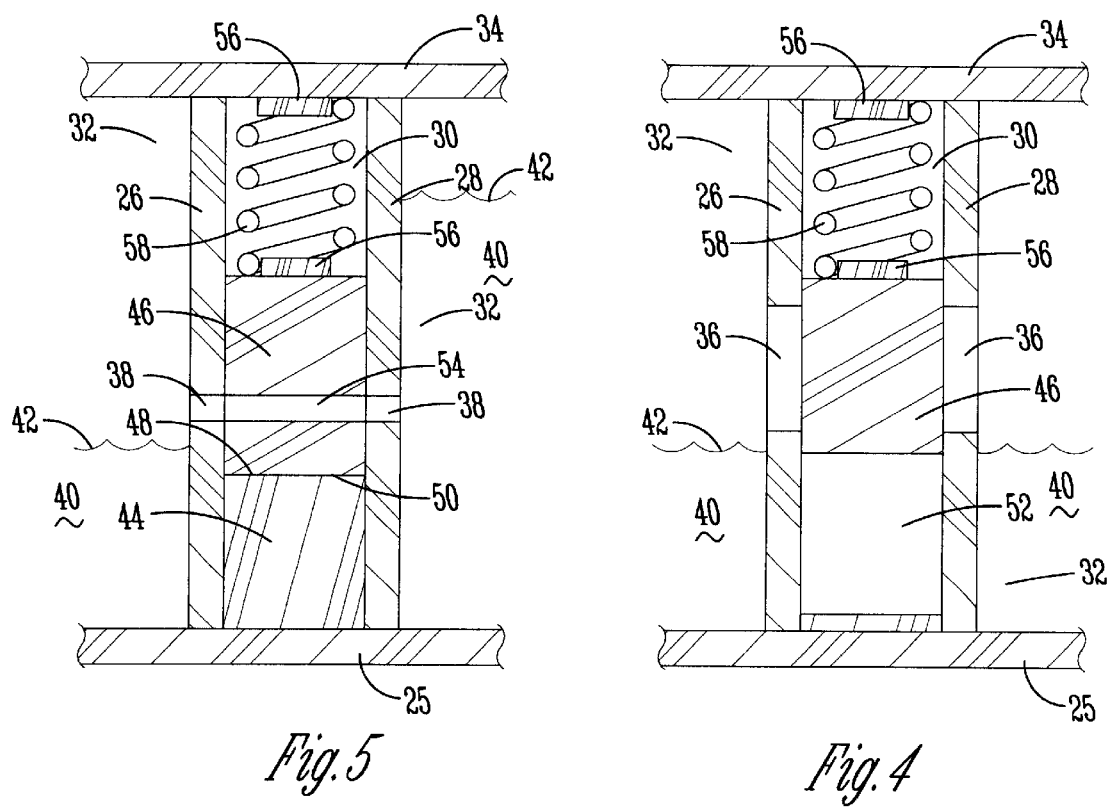

FLUID BALANCING RING AND METHOD FOR USING SAME

BACKGROUND OF THE INVENTION

The present invention relates to a fluid balancing ring and method for using same.

Fluid balancing rings are well known for correcting the unbalance of a rotating object such as a rotating washing machine tub. These fluid balancing rings are effective to reduce unbalances at high speeds resulting from objects within the tub being located off-center. An example of such a situation might be a clump of towels positioned along one side of a rotating washing machine tub.

These towels create an unbalance, and the fluid within the balance ring counteracts this unbalance situation when the tub is rotating at high speeds.

One disadvantage of prior art fluid balancing rings is that they are ineffective for balancing the rotating tub at lower speeds. Often the fluid within the balancing ring works against the balancing of the rotating tub at low rotating velocities. After the rotating velocity reaches and exceeds a critical rotating speed, the fluid within the fluid balance ring is effective to smooth out unbalances.

The critical rotational speed at which the fluid balancing ring become effective varies from assembly to assembly, depending upon the structure, mass, and geometry of the rotating assembly and its contents.

Therefore, a primary object of the present invention is the provision of an improved fluid balancing ring and method for using same.

A further object of the present invention is the provision of a fluid balancing ring which is effective to work against an unbalanced situation in a rotating assembly when the rotating assembly is both above and below a critical rotating velocity.

A further object of the present invention is the provision of a fluid balance ring which maintains an even distribution of fluid around the circumference of the balance ring when rotating below the critical velocity, and which permits the fluid to move freely around the circumference of the balancing ring when the rotating velocity is above the critical velocity.

A further object of the present invention is the provision of a fluid balancing ring having a plurality of valves and partitions around its circumference which prevent the circumferential movement of fluid when the balancing ring is rotating below the critical velocity and which permit the free circumferential movement of the fluid within the ring when the ring is rotating above a critical velocity.

A further object of the present invention is the provision of a valving system which is responsive to centrifugal force of the rotating ring assembly for opening and closing the valves.

A further object of the present invention is the provision of an improved fluid balancing ring and method for using same which is economical to manufacture, durable in use, and efficient in operation.

SUMMARY OF THE INVENTION

The foregoing objects may be achieved by a fluid balancing ring for balancing a tub rotating about a tub axis. The fluid balancing ring includes a ring housing surrounding a ring axis and having a hollow cross section to form an enclosed circular chamber. The ring housing is adapted to be mounted to the tub for rotation in unison therewith. A balancing fluid partially fills the circular chamber. A plurality of partitions in the chamber divide the chamber into a plurality of sub-chambers arranged in a circular array. A valve is mounted to each of the partitions and comprises a valve member that is movable in response to centrifugal force caused by the rotation of the ring about the ring axis from a closed position preventing fluid communication through the partitions to an open position permitting fluid communication through the partitions. A spring urges the valve member to its closed position and is adapted to yield in response to centrifugal force to permit the valve member to move to the open position, whereby the fluid within the ring is free to move between the sub-chambers.

A further feature of the present invention is the provision of a weight connected to the valve member. The weight is responsive to the centrifugal force to cause the valve member to move from its closed to its open position.

The valve member may be movable in a linear direction, or may be pivotal about an axis between its open and closed positions.

According to another feature of the present invention the valve member may be a plurality of ball valves, each mounted in one of the openings of one of the partitions.

BRIEF DESCRIPTION OF THE FIGURES OF THE DRAWINGS

FIG. 3 is a sectional view taken along line 3—3 of FIG. 2 showing the position of the valve members and the weights within the fluid balance ring.

FIGS. 4 and 5 are sectional view taken along lines 4—4 and 5—5 respectively.

DETAILED DESCRIPTION OF THE PREFERRED EMBODIMENT

Figure 1:
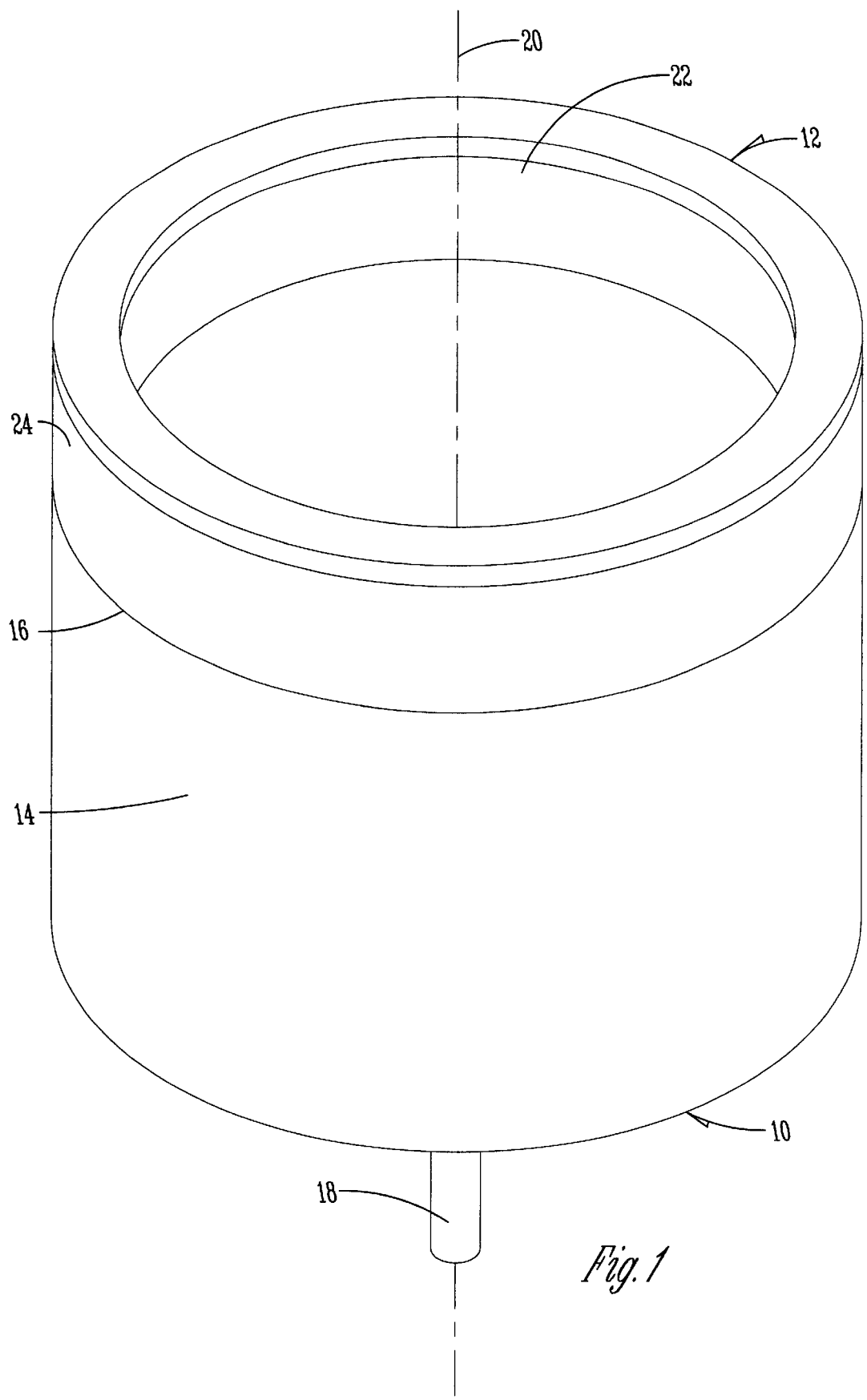
FIG. 1 is a perspective view of a washing machine drum utilizing the fluid balance ring of the present invention.
Figure 2:
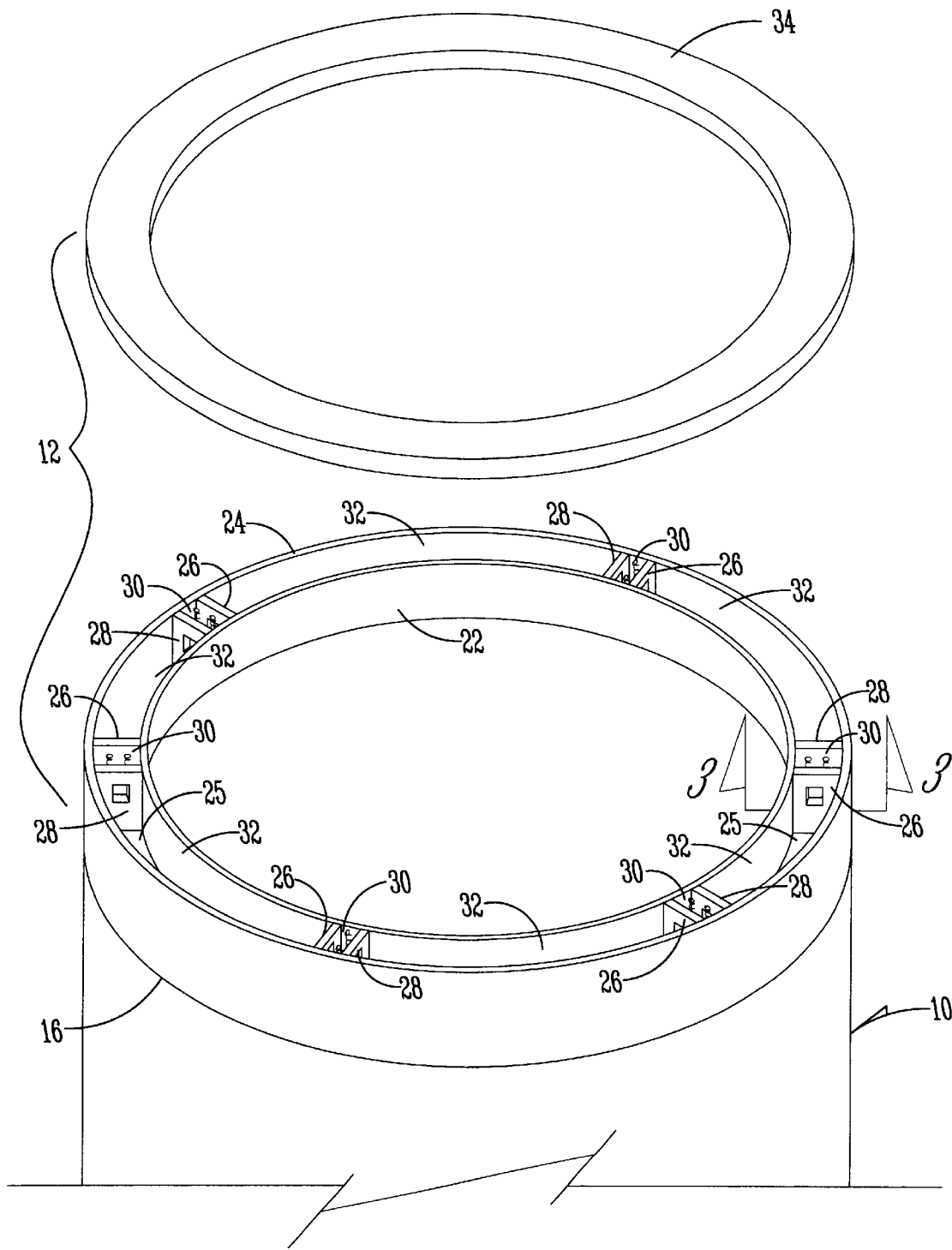
FIG. 2 is an exploded view of the fluid balance ring before any valves or weights are inserted therein.

Referring to FIGS. 1–5, a tub 10 includes a fluid balancing ring 12 attached to the top thereof. Tub 10 includes a circular tub side wall 14 having an upper edge 16. A shaft 18 extends downwardly from the bottom (not shown) of the tub 10. Tub 10 is adapted to rotate about an axis 20 which extends through the shaft 18 and which is centrally located with respect to the fluid balance ring 12.

Fluid balance ring 12 includes an inner annular ring wall 22 and an outer annular ring wall 24 which are joined at their lower edges by a bottom ring wall 25. Positioned radially around the ring 12 are a plurality of pairs of partitions, each of which include a first partition 26 and a second partition 28 which are spaced apart to form a valve space 30 therebetween. Interspersed between each of the partition pairs 26, 28 are a plurality of sub-cavities 32 which form a circular array around the circumference of the ring 12. An annular top wall 34 is shown in exploded view in FIG. 2.

Each partition 26, 28 is identically formed and includes a valve opening 36 therein and a weep hole 38 therein as shown in FIG. 5. Each partition 26, 28 includes a vent opening 39 at the upper edge adjacent the top wall 34 for permitting air to freely flow around the periphery of the balancing ring 12. A fluid, preferably water, is designated by the numeral 40 in FIGS. 3–5.

Within each of the valve spaces 30 are a wedge weight 44 and a valve block 46. Wedge weight 44 includes an inclined surface 48 and block 46 includes a complimentary inclined surface 50 which fits against the inclined surface 48. Block 46 includes a block valve opening 52 and a block weep hole 54. When ring 12 is at rest, the block weep hole 54 and the partition holes 38 are aligned. At rest the block valve opening 52 is positioned downwardly from valve openings 36 in partition 28. This is the normal closed position of the valve block 46, and is shown in FIGS. 3, 5.

Spring stubs 56 are provided on the under surface of top wall 34 and on the upper surface of the valve lock 46, and retentively retain the coil springs 58 therebetween.

FIGS. 3 and 4 illustrate the normal level 42 for a fluid, preferably water, within the sub-cavities 32. FIG. 5 illustrates this water level 42 at two different heights within two adjacent sub-cavities 32. When ring 12 is at rest weep holes 54, 38 are registered with one another and the water above the weep hole 38 can flow through the adjacent pairs of partitions 26, 28 to equalize the level between adjacent sub chambers 32. Thus when the fluid balancing ring is at rest, the fluids within all of the sub-cavities 30 equalize due to gravity and due to the registered weep openings 38, 54.

When the fluid balancing ring is at rest or below its critical rotational velocity, the springs 58 hold the valve block 46 and the weight 44 in a position shown in FIG. 3 which closes the valve openings 36 and prevents fluid communication between adjacent sub-cavities 30. When the rotational speed of the balance ring reaches the critical threshold rotational speed, the centrifugal force exerted on weight 44 causes it to move toward the outside ring wall 24. The springs 58 yield and the valve block 46 cams vertically upwardly until the window 52 is registered with the window 36. This permits the water 40 within all of the sub-chambers 30 to move freely through the partition pairs 26, 28 and to move to its natural location around the circumference of the balancing ring 12. If the tub 14 is unbalanced, the water will spread to a position to equalize that balance.

After the tub has completed its rotational cycle and comes to rest, the fluid within the various sub-chambers 32 again seeks its normal level 42 through the weep holes 38, 54.

The fluid is evenly distributed among the various sub-cavities 32 when the ring is at rest and as its rotational velocity increases towards the critical rotational speed. This causes the water to add to the mass of the tub and has the effect of resisting any unbalances that are occurring at these lower rotational velocities. When the rotational velocity reaches and exceeds the critical velocity the valves open and the fluid is free to move circumferentially to whatever position necessary to correct an unbalance situation.

Figure 6:
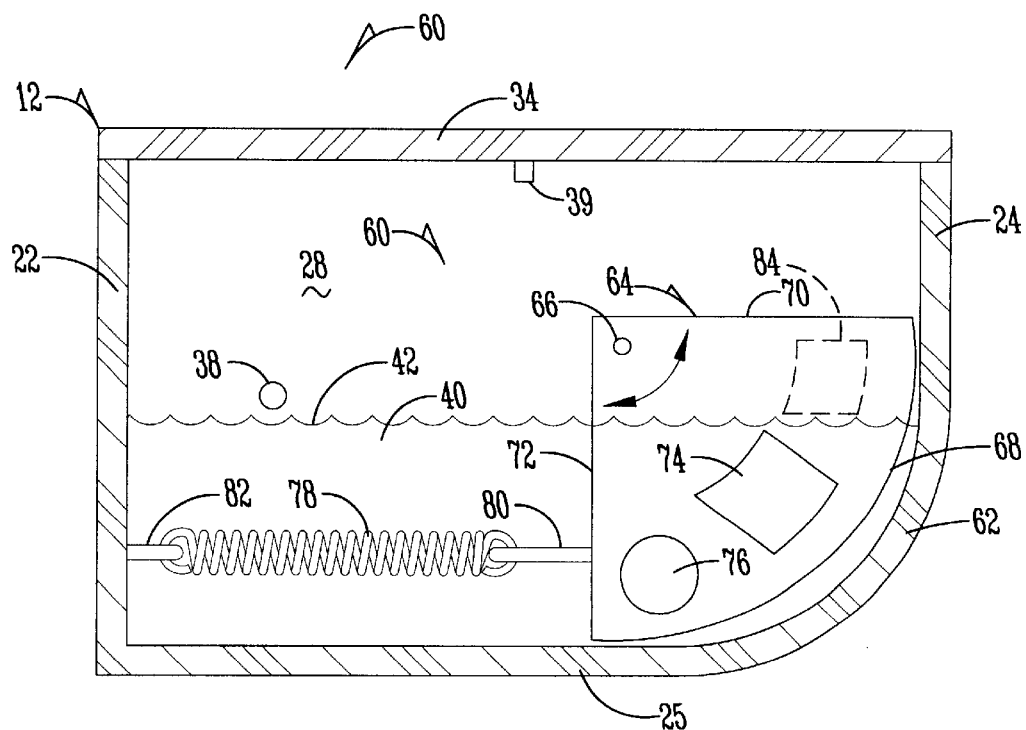
FIG. 6 is a sectional view similar to FIG. 3, but showing a modified valve for the present invention.

FIG. 6 shows a modified form 60 of the valve system. The modified form includes a curved wall 62 at the juncture between bottom wall 25 and outer ring wall 24. A valve member 64 is pivotally mounted for pivotal movement about a pivot 66, and includes a curved surface 68 as well as two straight surfaces 70, 72. Within valve member 64 is a valve window 74, and embedded within the valve member 64 is a weight 76.

A spring 78 is connected to a spring anchor 80 within the valve member 64 and a spring anchor 82 connected to the inner wall 22 of the fluid balance ring. Partitions 26, 28 each include a partition window 84 which is positioned above the water line 42 and above the valve member window 74 when the valve 64 is in the position shown in FIG. 6.

In operation, when the fluid balance ring 12 is at rest or is rotating below the critical velocity, the valve 64 remains in its closed position shown in FIG. 6. This prevents the fluid from passing between the various sub-cavities 30. As the rotational velocity of the fluid balance ring 12 reaches and surpasses the critical rotational speed, the weight 76 in response to centrifugal force causes the valve 64 to rotate in a counterclockwise direction until the window 74 and the window 84 are registered. This permits the fluid 40 to move between the various sub-cavities 32 so as to counteract any unbalance situation within the tub 14. As the rotational velocity drops again below the critical velocity the spring 78 causes the valve 64 to return to its closed position shown in FIG. 6. The weep holes 38 permit the fluid 40 then to equalize between the various cavities.

The weep holes 38 are located radially inwardly from the window 84, and the window 84 is located adjacent the outer wall 24. This is important because as the centrifugal force increases the fluid is urged against the outer wall 24. Thus it cannot pass through the weep hole 38 but is instead located radially outwardly from the weep hole 38. When the balancing ring 12 comes to rest the water then returns to its position shown in FIG. 6 and equalizes through the weep holes 38.

Figure 7:
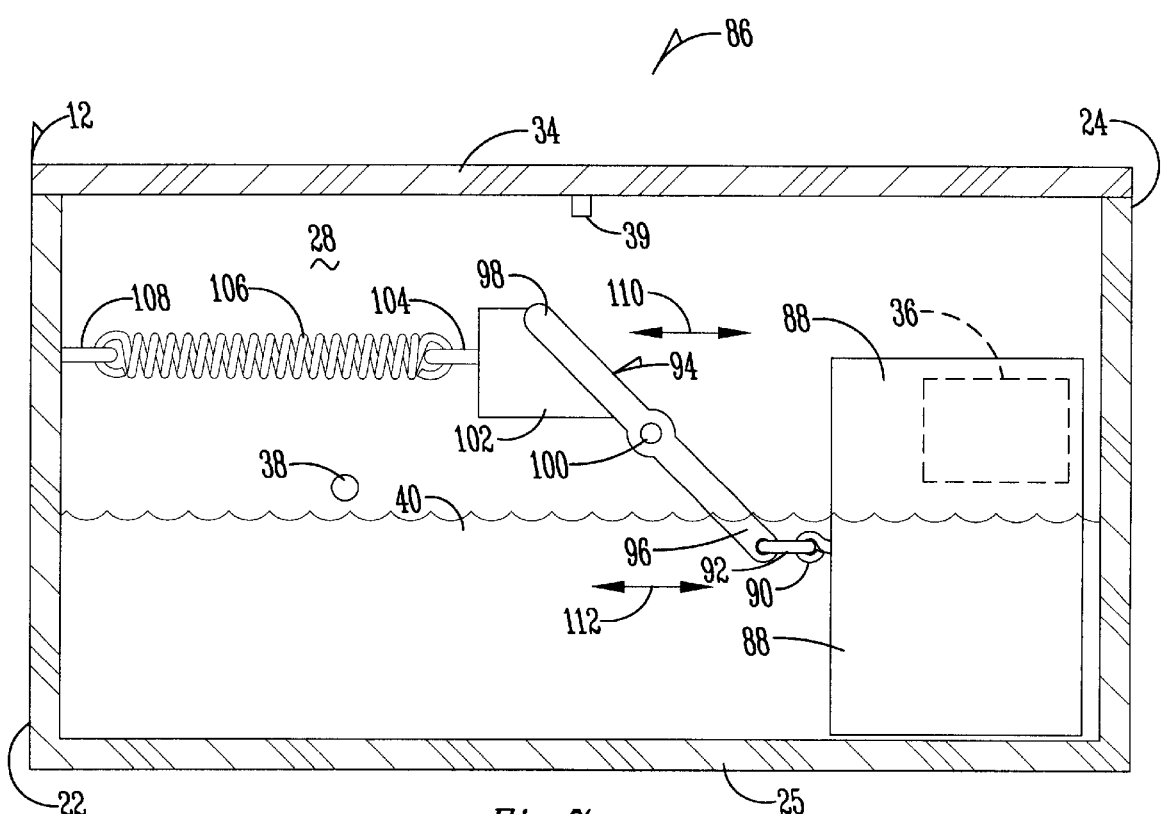
FIG. 7 is a view similar to FIG. 3 but showing a further modified form of the present invention.

FIG. 7 shows another modified valve system 86. This valve system utilizes a valve block 88 which has no windows in it. The valve block 88 however, covers the valve opening 36 in partition 28 in order to prevent fluid communication between the various sub-cavities 32. Block 88 includes a block anchor 90 which is connected by means of a connecting mechanism 92 to a first link end 96 of a link 94. Link 94 pivots about an axis 100. Link 94 includes a second link end 98 having a weight 102 thereon. A weight anchor 104 is connected to the weight 102 and also to a spring 106. Spring 106 is connected to a housing anchor 108. When the fluid balancing ring 12 is at rest the valve lock 88 and the link 94 are in the position shown in FIG. 7. As the rotational speed reaches and exceeds the critical speed, the weight 102 responds to centrifugal force and causes the upper end of link 98 to move in the direction indicated by arrow 110 and the lower end of link 98 to move in the direction of arrow 112. This causes the block 88 to move out of covering relation with the valve opening 36, and permits the fluid to communicate between the adjacent sub-cavities 32.

Figure 8:
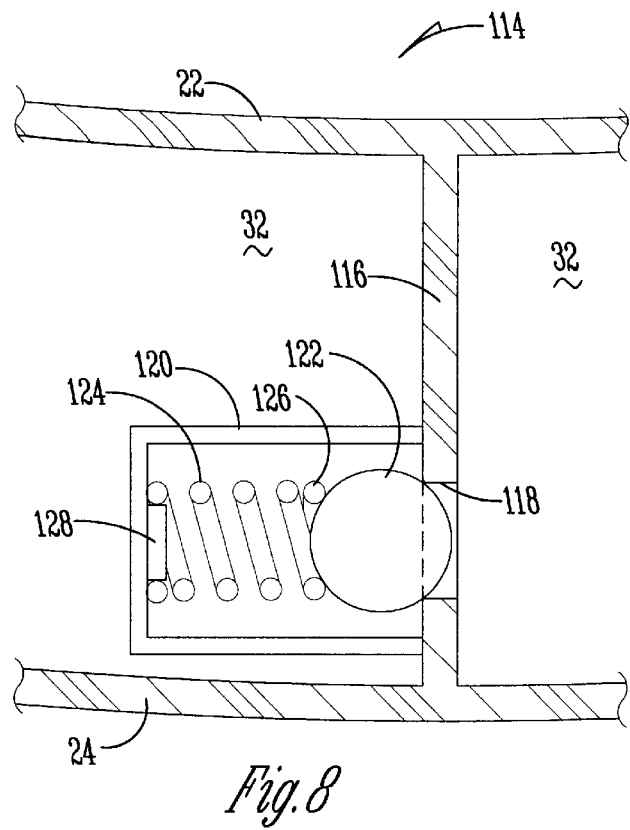
FIG. 8 is a detailed sectional view looking down on the balancing ring and showing a modified valve of the present invention.
Figure 9:
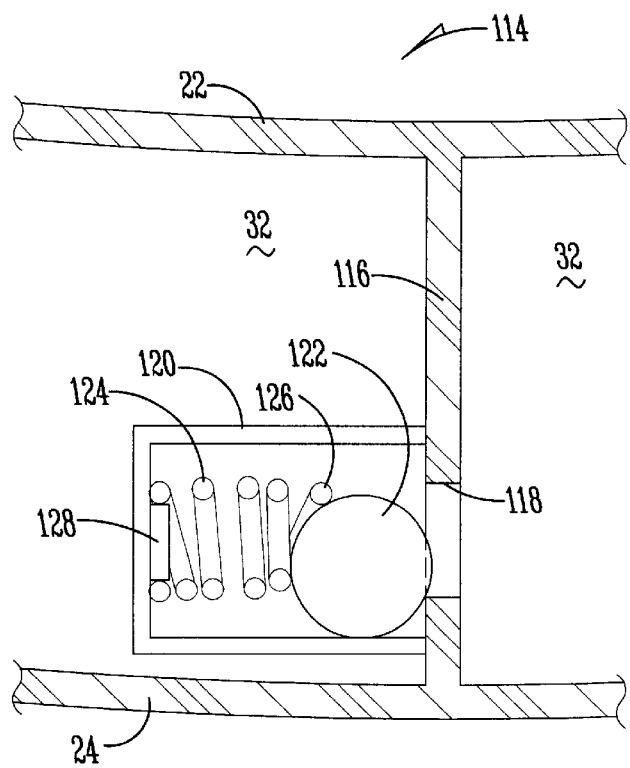
FIG. 9 is a sectional view similar to FIG. 8, but showing the valve in an open position.

Referring to FIGS. 8 and 9 a modified valve system 114 is shown. System 114 requires only a single partition 116 in the place of the partition pairs 26, 28 shown in the previous drawings. Partition 116 includes a valve opening 118 therein. A valve bracket 120 is attached to the partition 116 adjacent the outer radial edge thereof. A ball valve 122 is seated within the valve opening 118 so as to seal and prevent fluid communication between the adjacent sub-cavities 32. A coil spring 124 is compressed between the valve ball 122 and the bracket 120. Coil spring 124 includes a first end 126 which retentively engages the ball 122 and includes a second end which is retentively engaged by a spring mounting stub 128 on bracket 120. When the fluid balancing ring is at rest or below the critical rotational value, the valve ball 122 is in the position shown in FIG. 8 and prevents fluid communication between the adjacent sub-cavities 32. When the rotational velocity exceeds the critical value the valve ball 122 moves radially outwardly to the position shown in FIG. 9 in response to centrifugal force, thereby opening the valve opening 118 and permitting fluid communication between the adjacent sub-cavities 32.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing form the spirit or scope of the invention as further defined in the following claims.

What is claimed is:

1. A fluid balancing ring for dynamically balancing a tub rotating about a tub axis, comprising:
   a ring housing surrounding a ring axis and having a hollow cross section to form an enclosed circular chamber;
   a balancing fluid partially filling said circular chamber;
   a plurality of partitions in said circular chamber dividing said circular chamber into a plurality of sub-chambers arranged in a circular array;
   each of said partitions having a valve associated therewith that is movable from a closed position preventing fluid communication through said partitions to an open position permitting fluid communication through said partitions;
   a weight mounted for movement from a first position wherein said valve is in its said closed position to a second position moving said valve to its said open position in response to a predetermined centrifugal force on said weight caused by rotation of said ring; and
   a spring urging said weight to said first position wherein said valve is in said closed position.

2. A fluid balancing ring according to claim 1 wherein said partitions each comprise a valve opening therein, said valve comprising a valve member movable to a cover position in covering relation over said valve opening when said valve is in said closed position and movable at least partially away from said valve opening to an uncover position when said valve is in said open position.

3. A fluid balancing ring according to claim 2 wherein said weight includes a first cam surface and said valve member includes a second cam surface, said first and second cam surfaces bearing against one another to move said valve member from said cover position to said uncover position in response to centrifugal force caused by rotation of said ring.

4. A fluid balancing ring according to claim 2 wherein said valve member is movable in a linear direction.

5. A fluid balancing ring according to claim 2 wherein a link is connected between said spring and said valve member, said link being mounted for rotation about a link axis.

6. A fluid balancing ring according to claim 2 wherein said valve member is mounted for rotation about a valve member axis.

7. A fluid balancing ring according to claim 1 wherein each of said partitions includes a weep hole therein which permits fluid to equalize within said sub-chambers when said ring is at rest, but is located away from said fluid when said ring is rotating.

8. A fluid balancing ring according to claim 1 wherein said partitions are arranged in a plurality of partition pairs between each of said sub-chambers, said partitions within each of said partition pairs being spaced apart from one another to form a valve space there between, one of said valves and one of said weights being positioned within each of said valve spaces.

9. A fluid balancing ring for dynamically balancing a tub rotating about a tub axis, comprising:
   a ring housing surrounding a ring axis and having a hollow cross section to form an enclosed circular chamber, said ring housing being adapted to be mounted to said tub for rotation in unison therewith about said ring axis;
   a balancing fluid partially filling said circular chamber;
   a plurality of partitions in said circular chamber dividing said circular chamber into a plurality of sub-chambers arranged in a circular array;
   a valve mounted to each of said partitions and comprising a valve member that is movable from a closed position preventing fluid communication through said partitions to an open position permitting fluid communication through said partitions in response to centrifugal force caused by said rotation of said ring; and
   a spring urging said valve member to said closed position and being adapted to yield in response to said centrifugal force to permit said valve member to move to said open position, whereby said fluid is free to move between said sub-chambers.

10. A fluid balancing ring according to claim 9 wherein each of said partitions include a valve opening therein and said valve member is in sealed covering relation over said valve opening when said valve member is in said closed position, said valve member being out of sealed covering relation over said valve opening when said valve member is in said open position.

11. A fluid balancing ring according to claim 10 and further comprising a weight connected to said valve member, said weight being responsive to said centrifugal force to cause said valve member to move from said closed to said open position.

12. A fluid balancing ring according to claim 10 wherein said valve member is movable in a linear direction between said open and said closed positions.

13. A fluid balancing ring according to claim 10 wherein said valve member is pivotal about a valve member axis between said open and said closed positions.

14. A fluid balancing ring according to claim 10 wherein said valve member is a ball.

15. A fluid balancing ring according to claim 14 wherein said ball is seated over said valve opening when in said closed position and being at least partially unseated over said valve opening when in said closed position.

16. A method for dynamically balancing a tub that is rotatable about a tub axis comprising:
   attaching a balancing ring to said tub, said balancing ring having an annular ring housing extending around a ring axis which coincides with said tub axis when said balancing ring is attached to said tub;
   placing substantially equal quantities of fluid within a plurality of sub-chambers formed by a plurality of partitions in a hollow annular cavity within said ring housing, said subchambers being positioned in a circular array around said ring axis;
   rotating said tub and said balancing ring about said tub axis and said coinciding ring axis at an increasing rotational speed which commences below a threshold rotational speed and increases above said threshold rotational speed;

preventing said fluid quantities from communicating through said partitions to adjacent ones of said sub-chambers whenever the rotational speed of said tub and said balancing ring is below said threshold rotational speed;

opening fluid communication through said partitions whenever the rotational speed of said tub and said balancing ring is above said threshold rotational speed.

17. A method according to claim 16 and further comprising using a plurality of valves to accomplish said preventing and said opening steps, each of said valves being associated with one of said partitions and having a valve member movable from a closed position preventing fluid communication through said one partition to an open position permitting fluid communication through said one partition.

18. A method according to claim 17 and further comprising moving said valves from their said closed positions to their said open positions in response to the centrifugal force caused by rotation of said balancing ring at or above said threshold rotational speed.

* * * * *